(12) United States Patent
Yoo et al.

(10) Patent No.: US 12,204,915 B2
(45) Date of Patent: Jan. 21, 2025

(54) ELECTRONIC DEVICE INCLUDING CONTROLLER FOR SYSTEM BOOTING AND OPERATING METHOD THEREOF

(71) Applicant: Samsung Electronics Co., Ltd., Suwon-si (KR)

(72) Inventors: Sunghyun Yoo, Suwon-si (KR); Junhyeok Song, Suwon-si (KR); Kwangsik Yang, Suwon-si (KR); Kyungil Im, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 18/307,518

(22) Filed: Apr. 26, 2023

(65) Prior Publication Data

US 2023/0305855 A1    Sep. 28, 2023

Related U.S. Application Data

(63) Continuation of application No. PCT/KR2023/003463, filed on Mar. 15, 2023.

(30) Foreign Application Priority Data

Mar. 25, 2022  (KR) ........................ 10-2022-0037676

(51) Int. Cl.
*G06F 9/44* (2018.01)
*G06F 9/4401* (2018.01)
(52) U.S. Cl.
CPC .................................. *G06F 9/4408* (2013.01)
(58) Field of Classification Search
CPC ..................................................... G06F 9/4408
See application file for complete search history.

(56) References Cited

U.S. PATENT DOCUMENTS 9,317,691 B2    4/2016  Locke
9,760,461 B2    9/2017  Nitta
(Continued)

FOREIGN PATENT DOCUMENTS

CN       114090107 A    2/2022
JP         6073854 B2    2/2017
(Continued)

OTHER PUBLICATIONS

International Search Report dated Jun. 27, 2023, issued in International Application No. PCT/KR2023/003463.

*Primary Examiner* — Stefan Stoynov
(74) *Attorney, Agent, or Firm* — Jefferson IP Law, LLP

(57) ABSTRACT

An electronic device is provided. The electronic device includes a first controller, a first memory configured to store a first basic input output system (BIOS) and first firmware for controlling the first controller and functionally connected to the first controller, a second memory configured to store second firmware corresponding to the first firmware and a second BIOS corresponding to the first BIOS, and a second controller functionally connected to the first memory, the second memory, and the first controller, wherein the second controller is configured to compare the first firmware and the second firmware during power-on when the electronic device is applied with power, and turn on the first controller at least based on a result of the comparison, and wherein the first controller is configured to, in response to being turned on by the second controller, control a system of the electronic device to be booted.

20 Claims, 8 Drawing Sheets

(56) References Cited

U.S. PATENT DOCUMENTS

| | | | |
|---|---|---|---|
| 10,114,550 B2 | 10/2018 | Ryu et al. | |
| 10,180,842 B2 | 1/2019 | Moon | |
| 10,733,288 B2 | 8/2020 | Jeansonne et al. | |
| 10,803,176 B2 | 10/2020 | Villatel et al. | |
| 11,003,780 B2 | 5/2021 | Liu et al. | |
| 11,079,948 B2 | 8/2021 | Lee | |
| 2008/0184020 A1* | 7/2008 | Gee | H04L 67/34 713/2 |
| 2009/0254898 A1 | 10/2009 | Sareen et al. | |
| 2015/0324588 A1* | 11/2015 | Locke | G06F 21/562 713/2 |
| 2021/0117179 A1* | 4/2021 | Park | G06F 8/65 |
| 2021/0240567 A1 | 8/2021 | Hsu et al. | |
| 2021/0357537 A1 | 11/2021 | Alon et al. | |
| 2022/0083345 A1 | 3/2022 | Lin et al. | |
| 2023/0060908 A1 | 3/2023 | Wang | |

FOREIGN PATENT DOCUMENTS

| | | | |
|---|---|---|---|
| KR | 10-2017-0082954 A | 7/2017 | |
| KR | 10-2020-0089939 A | 7/2020 | |
| KR | 10-2324336 B1 | 11/2021 | |
| WO | 2021/154200 A1 | 8/2021 | |

* cited by examiner

ELECTRONIC DEVICE INCLUDING CONTROLLER FOR SYSTEM BOOTING AND OPERATING METHOD THEREOF

CROSS-REFERENCE TO RELATED APPLICATION(S)

This application is a continuation application, claiming priority under § 365(c), of an International application No. PCT/KR2023/003463, filed on Mar. 15, 2023, which is based on and claims the benefit of a Korean patent application number 10-2022-0037676, filed on Mar. 25, 2022, in the Korean Intellectual Property Office, the disclosure of which is incorporated by reference herein in its entirety.

TECHNICAL FIELD

The disclosure relates to an electronic device including a controller for system booting, and a method for booting a system by using an additional controller included in the electronic device.

BACKGROUND ART

An electronic device may include a central processing unit (CPU), a memory, and a system for input/output. The memory of the electronic device may store various data for performing functions of the electronic device. For example, the memory may store a basic input output system (BIOS). The BIOS may include software for controlling and testing a system for input/output of an electronic device. For example, the BIOS may include a program for performing a test (verification) process to identify whether the system for input/output of the electronic device is operating correctly when power is supplied to a computer.

The electronic device may perform a boot operation when power is supplied. For example, a system embedded controller (EC) included in the electronic device may detect input of a booting command and control a central processing unit (CPU) so as to perform a boot operation. When performing a boot operation, the electronic device may perform a test operation of the electronic device by using the BIOS stored in the memory. For example, the CPU may load the BIOS into the CPU and execute the BIOS to perform a boot operation. As the boot operation is performed, a user of the electronic device may use the electronic device at an appropriate level (e.g., a window level).

The above information is presented as background information only to assist with an understanding of the disclosure. No determination has been made, and no assertion is made, as to whether any of the above might be applicable as prior art with regard to the disclosure.

DISCLOSURE

Technical Problem

The electronic device may store, in a memory, firmware for operations of various controllers (e.g., a system embedded controller) included in the electronic device. In addition, the electronic device may store, in a memory, BIOS for controlling a basic input/output system of the electronic device. However, due to the process of using the electronic device or a specific reason, the firmware and BIOS stored in the memory may be manipulated and/or damaged. When the electronic device executes various functions of the electronic device by using the damaged firmware and BIOS, a problem may occur that the electronic device does not operate normally. In addition, the electronic device is unable to identify manipulation and/or corruption of the firmware and BIOS before system booting.

Further, in order to address the above issue, simply merging an existing controller with a controller configured to verify the integrity of firmware and/or BIOS stored in a memory may result in system efficiency deterioration due to excessive firmware for the operation of the merged controller.

Aspects of the disclosure are to address at least the above-mentioned problems and/or disadvantages and to provide at least the advantages described below. Accordingly, an aspect of the disclosure is to provide an electronic device may verify firmware and BIOS for a controller, which are stored in a memory before system booting of the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first controller, a first memory configured to store a first basic input output system (BIOS) and first firmware for controlling the first controller and functionally connected to the first controller, a second memory configured to store second firmware corresponding to the first firmware and a second BIOS corresponding to the first BIOS, and a second controller functionally connected to the first memory, the second memory, and the first controller, wherein the second controller is configured to compare the first firmware and the second firmware during power-on when the electronic device is applied with power, and turn on the first controller at least based on a result of the comparison, and wherein the first controller is configured to, in response to being turned on by the second controller, control a system of the electronic device to be booted.

In accordance with another aspect of the disclosure, a method for operating an electronic device including a first memory, a second memory, a first controller, and a second controller is provided. The method includes comparing, by the second controller, a first firmware, which is stored in the first memory and configured to control the first controller, and a second firmware stored in the second memory and corresponding to the first firmware, turning on the first controller at least based on a result of the comparison, by the second controller, and controlling a system of the electronic device to be booted, by the first controller, in response to the first controller being turned on by the second controller.

Advantageous Effects

An electronic device according to various embodiments disclosed in this document may identify, before system booting, manipulation and/or corruption of firmware and/or BIOS stored in a memory and configured to control a controller. For example, the electronic device may secure integrity by verifying firmware stored in a memory and configured to control a system embedded controller before system booting. In addition, for example, the electronic device may secure integrity by verifying the BIOS stored in the memory before system booting. Accordingly, the electronic device can previously prevent problems caused by damage to firmware and/or BIOS after system booting.

Further, according to various embodiments of the disclosure, the electronic device may identify firmware and/or BIOS for controlling a system embedded controller before booting the system, and reconstruct the firmware and/or BIOS when the same is manipulated or damaged.

In addition, according to various embodiments, the electronic devices may provide different security levels according to the purpose of electronic device use (e.g., business-to-business (B2B), business-to-consumer (B2C)).

In addition, various effects identified directly or indirectly through this document may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
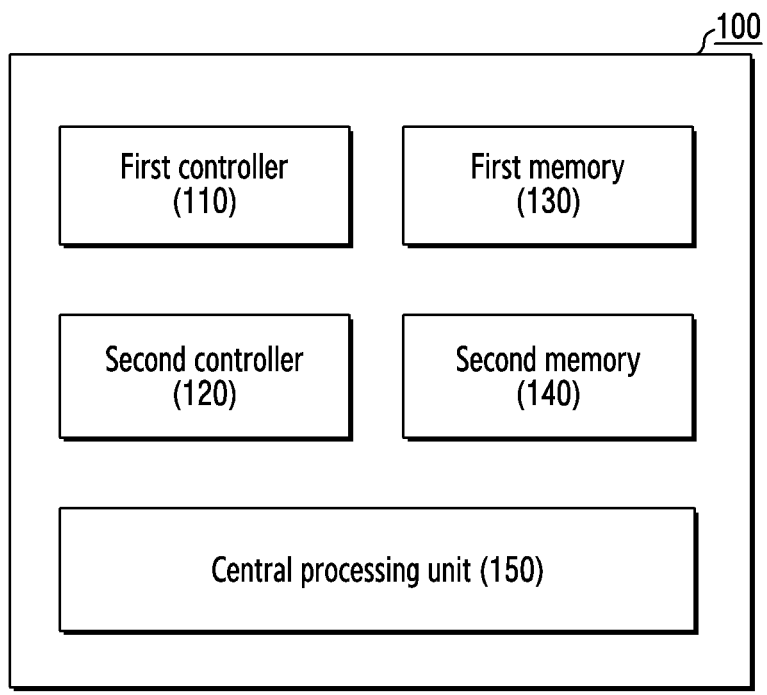
FIG. 1 is a block diagram of an electronic device according to an embodiment of the disclosure.

FIG. 1 is a block diagram of an electronic device according to an embodiment of the disclosure.

Referring to FIG. 1, an electronic device 100 may include a first controller 110, a second controller 120, a first memory 130, a second memory 140, and/or a central processing unit (CPU) 150. The elements listed above may be operatively or electrically connected to each other. Some of the elements of the electronic device 100 shown in FIG. 1 may be modified, deleted, or added as an example. According to embodiments of the disclosure, other general-purpose elements may be further included in addition to the elements shown in FIG. 1.

The electronic device 100 may include the CPU 150 and an input/output device (not shown), and may be various types of devices. For example, the electronic device 100 may include a computer device, a portable multimedia device, a notebook computer, a laptop computer, a portable communication device (e.g., a smartphone), or a home appliance. The electronic device 100 according to the embodiment of this document is not limited to the above devices.

The first controller 110 may be a controller configured to perform system management of the electronic device 100 and may include a system embedded controller. The first controller 110 may control an operation for system booting of the electronic device 100. For example, the first controller 110 may load a program stored in the first memory 130 and execute an operation for system booting.

The first controller 110 may be connected to the first memory 130, the CPU 150, and the second controller 120. The first controller 110 may control the CPU 150 by executing an instruction stored in the first memory 130. For example, the first controller 110 may acquire a boot request and transmit a system booting command to the CPU 150 in response to the boot request.

The second controller 120 may be a controller distinct from the first controller 110 and may control a verification operation of the electronic device 100 during power-on when the electronic device 100 is applied with power. The second controller 120 may be connected to the first memory 130, the second memory 140, and the first controller 110. The second controller 120 may identify whether the instructions stored in the first memory 130 and the second memory 140 are manipulated and/or damaged, and may turn-on or turn-off the first controller 110 to boot the system of the electronic device 100.

The first memory 130 and the second memory 140 may store various types of data. According to an embodiment, the first memory 130 and the second memory 140 may be configured by various types of memories. For example, the first memory 130 and the second memory 140 may be configured by a read-only memory (ROM) (e.g., a single program initiator ROM (SPI ROM)). However, it is not limited to the above example, and the first memory 130 and the second memory 140 may be configured by one of various nonvolatile memories.

The first memory 130 may store a first basic input output system (BIOS). The first BIOS may include a program configured to be automatically executed when the electronic device 100 is turned on to inspect the state of the electronic device 100, perform a task for system initialization, and identify which peripheral devices are connected to the electronic device 100 during the initialization task.

The first memory 130 may store first firmware including a program for controlling the first controller 110. The first controller 110 may load the first firmware and perform various operations at least based on the first firmware.

The second memory 140 may store data for the recovery of the first memory 130. For example, the second memory may store backup (or restoration) data with respect to data stored in the first memory 130. In another example, the second memory 140 may store a second BIOS corresponding to the first BIOS. The second BIOS may include a program configured to be automatically executed when the electronic device 100 is turned on to inspect the state of the electronic device 100, perform a task for system initialization, and identify which peripheral devices are connected to the electronic device 100 during the initialization task.

The unmanipulated first BIOS and the second BIOS may be the same. The second memory 140 may store second firmware corresponding to the first firmware including a program for controlling the first controller 110. The first firmware that is not manipulated and/or damaged may be the same as the second firmware. The second memory 140 may store third firmware (not shown) including a program for controlling the second controller 120. The second controller 120 may load third firmware and perform various operations at least based on the third firmware.

According to an embodiment of the disclosure, the CPU 150 may be expressed as an application processor according to the form of the electronic device 100. However, the CPU 150 is not limited to the above example, and the CPU 150 may be expressed as a main processor.

According to an embodiment of the disclosure, the electronic device 100 may include a main processor (e.g., a central processing unit or an application processor) or a secondary processor (e.g., a graphic processing unit, a neural processing unit (NPU), an image signal processor, a sensor hub processor, or a communication processor) that may operate independently of or together with the main processor.

The CPU 150 may upload an operating system stored in the first memory 130 to a memory (not shown) included in the CPU 150 to boot the operating system. In addition, the CPU 150 may execute the first BIOS stored in the first memory 130 to normally boot the system of the electronic device 100. The CPU 150 may be electrically or operatively connected to various elements included in the electronic device 100. In addition, the CPU 150 may perform computation or data processing relating to control and/or communication of at least one other element of the electronic device 100 by using instructions stored in at least one memory of the electronic device 100. The at least one memory may store instructions causing, when executed, the CPU 150 to process data or control elements of the electronic device 100 to perform an operation of the electronic device 100.

The second controller 120 may verify whether data stored in the first memory 130 and the second memory 140 is manipulated and/or damaged during power-on when the electronic device 100 is applied with power. For example, during power-on when the electronic device 100 is applied with power, the second controller 120 may compare first firmware for controlling the first controller 110 and second firmware corresponding to the first firmware. The second controller 120 may be configured to load at least a part of the first firmware and the second firmware from the first memory 130 and the second memory 140, respectively, to compare the first firmware and the second firmware. The second controller 120 may compare the loaded first firmware and second firmware to verify the first firmware.

The second controller 120 may transmit a first control signal including a standby signal to the first controller in order to secure a right to control the electronic device during power-on when the electronic device is applied with power.

The second controller 120 may turn on the first controller 110 at least based on a result of the comparison. For example, when the first firmware and the second firmware are the same according to a result of the comparison, the second controller 120 may determine that the first firmware is not manipulated and/or damaged, and turn on the first controller 110. For example, the second controller 120 may transmit a second control signal including a turn-on signal to the first controller 110.

In response to the first controller 110 being turned on, the first controller may load the first firmware stored in the first memory 130. The first controller 110 may perform an operation by loading the first firmware into the first buffer memory included in the first controller 110 and executing the loaded first firmware.

The first controller 110 may control the system of the electronic device 100 to be booted, in response to being turned on by the second controller 120. For example, the first controller 110 may acquire a boot request related to system booting of the electronic device 100. In addition, the first controller 110 may transmit a system booting command to the CPU 150 based on the acquired boot request.

The CPU 150 may perform a system boot operation by executing the first BIOS stored in the first memory 130 based on the received system booting command. For example, the CPU 150 may load the first BIOS into a third buffer memory (not shown) included in the CPU 150 and execute the loaded first BIOS to boot the system.

The second controller 120 may verify the first firmware before booting the system and verify the first BIOS to prevent problems caused by program manipulation during booting of the system.

Figure 2:
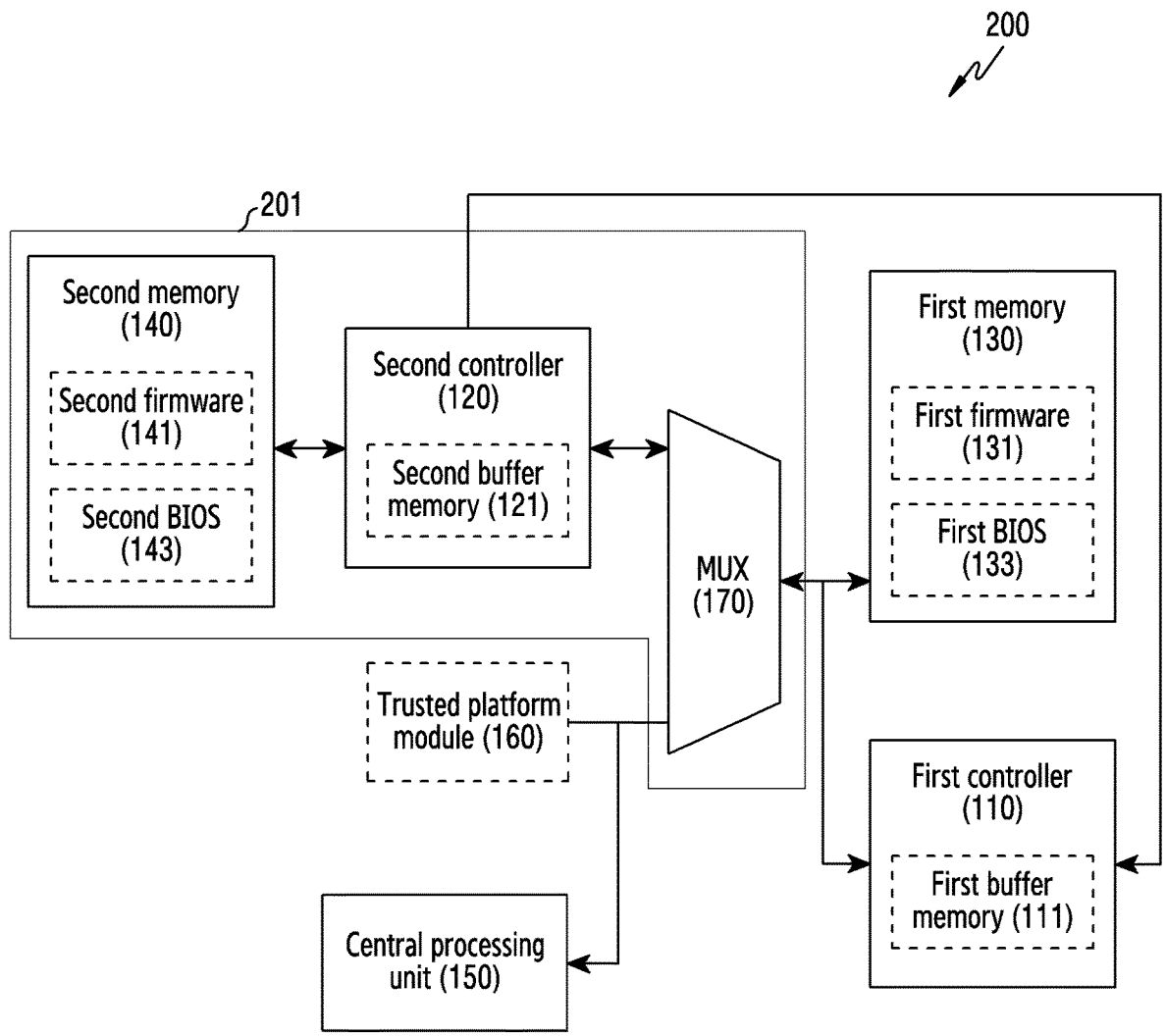
FIG. 2 illustrates a connection relationship between elements of an electronic device according to an embodiment of the disclosure.

FIG. 2 illustrates a connection relationship 200 between elements of an electronic device according to an embodiment of the disclosure.

Referring to FIG. 2, a connection relationship between elements of the electronic device 100 is illustrated. The electronic device 100 may include a first controller 110, a second controller 120, a first memory 130, a second memory 140, a central processing unit 150, and a trusted platform module (TPM) 160, and/or a multiplexer 170 configured to perform connection between the elements. According to an embodiment of the disclosure, the above-listed elements may be operatively or electrically connected to each other. Some of the elements of the electronic device 100 shown in FIG. 2 may be modified, deleted, or added as an example. According to embodiments of the disclosure, other general-purpose elements may be further included in addition to the elements shown in FIG. 2. Elements included in the electronic device 100 may be directly or indirectly connected through various methods without being limited to the connection relationship 200 shown in FIG. 2. Hereinafter, content duplicated with the content described with reference to FIG. 1 may be omitted.

The electronic device 100 may include the first controller 110, the second controller 120, the first memory 130, a second memory 140, the central processing unit 150, the trusted platform module (TPM) 160, and/or the multiplexer 170 configured to perform connection between the elements. The electronic device 100 is not limited to the example shown in FIG. 2 and may include a plurality of multiplexers for a connection relationship between elements.

The first memory 130 may store a first firmware 131 including programs for controlling the first controller 110, and a first BIOS 133. The second memory 140 may store a second firmware 141 corresponding to the first firmware 131 and used to restore (or back up) data stored in the first memory 130, and a second BIOS 143 corresponding to the first BIOS 133. When the first memory 130 is not manipulated or damaged, the first firmware 131 and the second firmware 141 may be the same, and the first BIOS 133 and the second BIOS 143 may be the same. The second memory 140 may store third firmware (not shown) including a program for controlling the second controller 120.

Each of the first controller 110, the second controller 120, and/or the CPU 150 may include a buffer memory for temporarily storing data when executing an operation. For example, the first controller 110 may include a first buffer memory 111, the second controller 120 may include a second buffer memory 121, and/or the CPU 150 may include a third buffer memory (not shown).

The TPM 160 is a module for identifying system security of the electronic device 100 and may store a security key. The TPM 160 may perform an operation related to security when the operating system is uploaded to the memory of the CPU 150 according to system booting of the electronic device 100. For example, while executing the booting of the system, the electronic device 100 may verify the integrity of the electronic device 100 by using a security key stored in the second controller 120, a security key stored in the CPU 150, and a security key included in the TPM 160. According to various embodiments of the disclosure, the TPM 160 may be used to perform various operations for maintaining security of the electronic device 100.

The first controller 110 may be connected to the second controller 120, the first memory 130, and the CPU 150 directly or by using a multiplexer 170.

The first controller 110 may be connected to the second controller 120 to transmit or receive various control signals. For example, when the first controller 110 acquires a system boot request of the electronic device 100 in a turned-on state, the first controller 110 may transmit the boot request to the second controller 120. The second controller 120 may perform an operation of verifying the first BIOS based on the boot request acquired from the first controller 110. An operation of verifying the first BIOS by the first controller 110 will be described later in detail with reference to FIGS. 4 to 7.

The first controller 110 may receive a control signal including various signals from the second controller 120. For example, the first controller 110 may be connected to the second controller 120 to transmit a turn-on signal, a standby signal, and/or a booting signal. For example, the second controller 120 may transmit a first control signal including a standby signal to the first controller 110 in order to secure a right to control the electronic device 100 during power-on when power is applied. The first controller 110 may not operate based on the first control signal even though power is applied. In addition, the second controller 120 may transmit a second control signal including a turn-on signal to the first controller 110 when the verification operation on the first firmware to be executed by the first controller 110 is completed. The first controller 110 may be turned on based on the second control signal. The second controller 120 may perform a verification operation on the first BIOS in response to the boot request transmitted from the first controller 110, and may transmit a booting signal to the first controller 110 at least based on a result of the verification operation.

The first controller 110 may include a first buffer memory 111 to store and use various data. For example, the first controller 110 may load various programs including instructions from the first memory 130 into the first buffer memory 111. For example, at the time of turn-on, the first controller 110 may load the first firmware 131 including programs for controlling the first controller 110 stored in the first memory 130 into the first buffer memory 111. At the time of turn-on, the first controller 110 may operate by executing the first firmware 131 loaded in the first buffer memory 111.

The second controller 120 may be directly or indirectly connected to the second memory 140, the first memory 130, the first controller 110, and/or the TPM 160. For example, the second controller 120 may be indirectly connected to the first memory 130 and/or the first controller 110 through the multiplexer 170. According to an embodiment of the disclosure, the second controller 120, the second memory 140, and/or the multiplexer 170 may be configured as the first module 201. According to another embodiment of the disclosure, the second controller 120 and the second memory 140 may be configured as a single chip. Accordingly, when the connection between elements of the electronic device 100 is changed because the security level is changed according to the purpose of use of the electronic device 100, the electronic device 100 may be configured to omit the first module 201. For example, when the purpose of use of the electronic device 100 corresponds to B2C rather than B2B, the electronic device 100 may be configured not to include the first module 201 and omit performing operations using the first module 201.

The second controller 120 may perform a verification operation on the first firmware 131 stored in the first memory 130 during power-on when the electronic device 100 is applied with power. For example, the second controller 120 is connected to the first memory 130 and the second memory 140, and may load at least a part of the first firmware 131 and the second firmware 141 from the first memory 130 and the second memory 140, respectively. The second controller 120 may temporarily store the loaded first firmware 131 and the second firmware 141 in the second buffer memory 121 to verify the first firmware 131, and may compare the first firmware 131 and the second firmware 141 to perform a verification operation on the first firmware 131.

The second controller 120 may perform a verification operation on the first BIOS 133 stored in the first memory 130 as a boot request is transferred from the first controller 110. For example, the second controller 120 is connected to the first memory 130 and the second memory 140, and may load at least a part of the first BIOS 133 and the second BIOS 143 from the first memory 130 and the second memory 140, respectively. The second controller 120 may temporarily store the loaded first BIOS 133 and the second BIOS 143 in the second buffer memory 121 to verify the first BIOS 133, and may compare the first BIOS 133 and the second BIOS 143 to perform a verification operation on the first BIOS 133.

The second memory 140 may include third firmware (not shown) for controlling the second controller 120. The second controller 120 may operate by loading third firmware into the second buffer memory 121 through connection with the second memory 140 and executing the third firmware.

The first controller 110 may be indirectly connected to the CPU 150 through the multiplexer 170. However, when connections between elements of the electronic device 100 are changed according to the purpose of use of the electronic device 100, the first controller 110 may be directly connected to the CPU 150. The first controller 110 may be connected to the CPU 150 to transmit a system booting command. The first controller 110 may transmit a booting command to the CPU 150 in response to acquiring a system boot request. The CPU 150 may execute the system booting command in response to the acquired booting command.

The CPU 150 may be directly or indirectly connected to the TPM 160, the first memory 130, and the first controller 110. The CPU 150 may upload, in response to a booting command acquired from the first controller 110, the first BIOS 133 stored in the first memory 130 into a third buffer memory (not shown) included in the CPU 150. The CPU 150 may perform a system boot operation by executing the loaded first BIOS 133.

Figure 3:
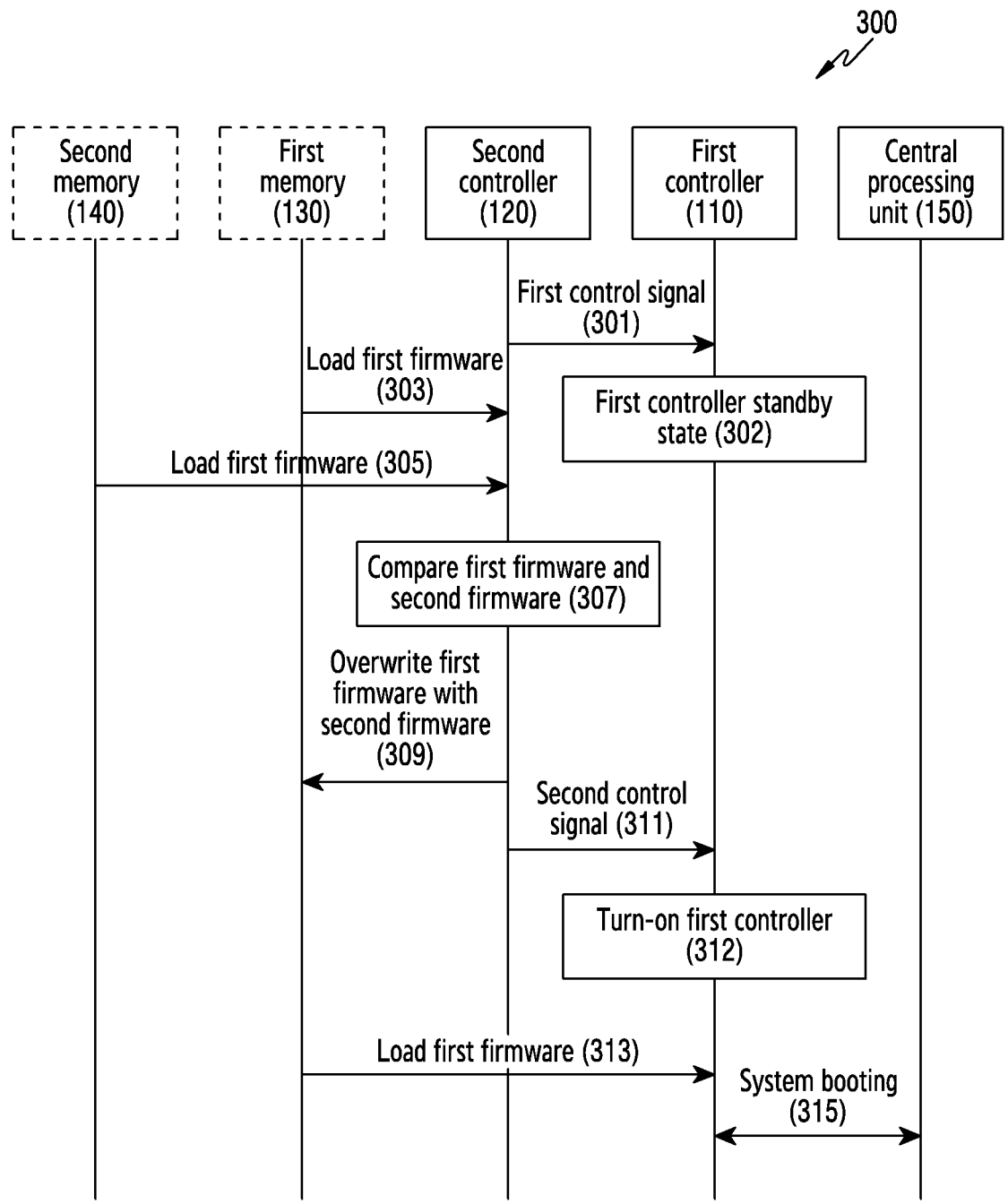
FIG. 3 is a flow diagram illustrating a firmware verification and recovery operation of an electronic device according to an embodiment of the disclosure.

FIG. 3 is a flow diagram 300 for explaining a firmware verification and recovery operation of an electronic device according to an embodiment of the disclosure.

Referring to FIG. 3, the electronic device 100 may include a second memory 140, a first memory 130, a second controller 120, a first controller 110, and/or a central processing unit 150. The elements may represent a configuration similar to that of the electronic device 100 described with reference to FIGS. 1 and 2. Therefore, contents duplicated with or similar to contents to those described with reference to FIGS. 1 and 2 may be omitted.

The second controller 120 may transmit a first control signal to the first controller 110 in operation 301, during power-on when the electronic device 100 is applied with power. The first control signal may include a standby command signal by which the second controller 120 controls the electronic device 100 even during power-on. In operation 302, the first controller 110 may maintain a standby state without being turned on in response to the first control signal.

The second controller 120 may load the first firmware (e.g., the first firmware 131) stored in the first memory 130 in operation 303, and may load the second firmware (e.g., the second firmware 141) stored in the second memory 140 in operation 305. The second controller 120 may perform operations 303 and 305 to verify the first firmware before the first controller 110 is turned on.

In operation 307, the second controller 120 may compare the first firmware and the second firmware. For example, the second controller 120 may verify that the first firmware is not manipulated or damaged because the second firmware and the first firmware are the same. The second controller 120 may determine that the first firmware is manipulated or damaged when the first firmware and the second firmware are not identical as a result of the comparison.

When the first firmware and the second firmware are not the same, the second controller 120 may overwrite the first firmware stored in the first memory 130 with the second firmware in operation 309. For example, the second controller 120 may overwrite the first firmware with the second firmware that is not manipulated. In operation 307, the second controller 120 may verify the first firmware again by performing an operation of comparing between the first firmware and the second firmware again in response to overwriting.

When the first firmware and the second firmware are determined to be identical as a result of comparison therebetween, the second controller 120 may transmit a second control signal including a turn-on command to the first controller 110 in operation 311. Upon receiving the second control signal including the turn-on command, the first controller 110 may be turned on in operation 312.

As the first controller 110 is turned on by the second controller 120, the first controller may load the first firmware stored in the first memory 130 in operation 313. For example, the first controller 110 may copy an image of the first firmware to a first buffer memory (e.g., the first buffer memory 111) included in the first controller 110. According to an embodiment of the disclosure, the first controller 110 may perform an operation by executing the loaded first firmware.

In operation 315, the first controller 110 and the CPU 150 may perform an operation for booting the system of the electronic device 100.

Figure 4:
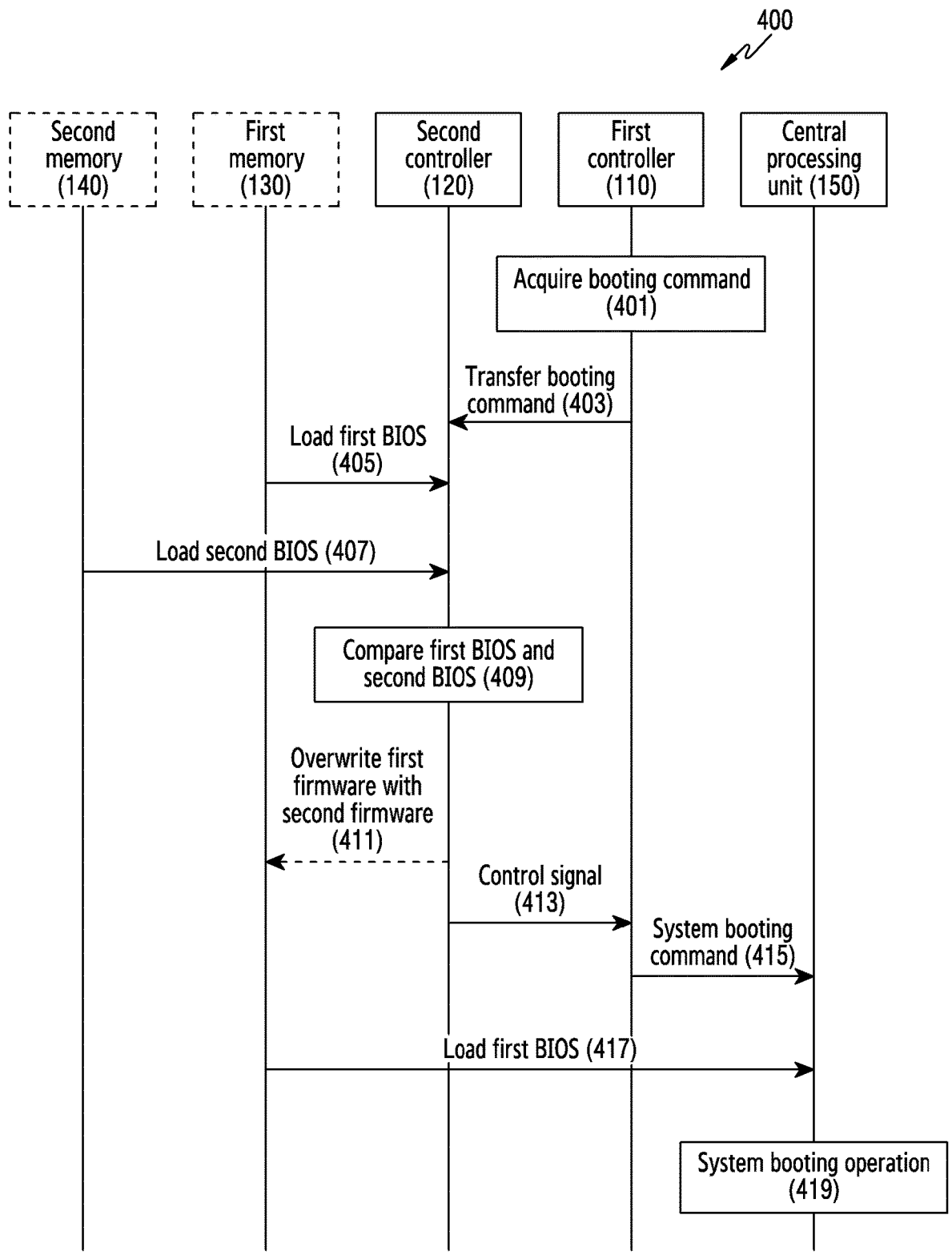
FIG. 4 is a flow diagram illustrating a BIOS verification and recovery operation of an electronic device according to an embodiment of the disclosure.

FIG. 4 is a flow diagram 400 illustrating a BIOS verification and recovery operation of an electronic device according to an embodiment of the disclosure.

Referring to FIG. 4, the electronic device 100 may include the second memory 140, the first memory 130, the second controller 120, the first controller 110, and/or the central processing unit 150. The elements may represent a configuration similar to that of the electronic device 100 described with reference to FIGS. 1 and 2. Therefore, a description of elements similar to those described with reference to FIGS. 1 and 2 is omitted.

When the electronic device 100 is in a terminated state while power is applied, the first controller 110 may acquire a booting command of the electronic device in operation 401. For example, the turned-on first controller 110 may acquire an input related to system booting (e.g., a boot request) acquired from a user of the electronic device 100 through a physical key (e.g., a power button) included in the electronic device 100. According to various embodiments of the disclosure, the first controller 110 may acquire a boot request through a user or various methods including generation of a preconfigured event.

In response to acquiring the boot command, the first controller 110 may transfer the boot command to the second controller 120 in operation 403. The first controller 110 may transfer the booting command, and the second controller 120 may secure a right to control the electronic device 100 upon receiving the booting command.

In response to acquiring the boot command, the second controller 120 may load the first BIOS (e.g., the first BIOS 133) stored in the first memory 130 in operation 405, and may load the second BIOS (e.g., the second BIOS 143) stored in the second memory 140 in operation 407. The second controller 120 may perform operations 405 and 407 to verify the first BIOS before the system of the electronic device 100 is booted.

In operation 409, the second controller 120 may compare the first BIOS and the second BIOS. For example, when the second BIOS and the first BIOS are the same, the second controller 120 may verify that the first BIOS is not manipulated or damaged. When the first BIOS and the second BIOS are not identical as a result of the comparison, the second controller 120 may determine that the first BIOS is manipulated or damaged.

When the first BIOS and the second BIOS are not the same, the second controller 120 may overwrite the first BIOS, which is stored in the first memory 130, with the second BIOS in operation 411. For example, the second controller 120 may overwrite the first BIOS with the unmanipulated second BIOS. In operation 411, in response to overwriting, the second controller 120 may re-verify the first BIOS by performing a comparison operation between the first BIOS and the second BIOS again.

When it is determined that the first BIOS and the second BIOS are identical as a result of comparing the first BIOS and the second BIOS, the second controller 120 may transmit a control signal including a booting command to the first controller 110 in operation 413.

Upon receiving the control signal including the booting command, the first controller 110 may transmit a system booting command to the CPU 150 in operation 415.

In response to receiving the system booting command from the first controller 110, the CPU 150 may load the first BIOS stored in the first memory 130 in operation 417.

The CPU 150 may load the first BIOS and execute the loaded first BIOS to perform a boot operation of the system, in operation 419.

According to an embodiment of the disclosure, the electronic device 100 may identify whether the first BIOS and the first firmware for controlling the first controller (e.g., a system embedded controller) are manipulated or damaged before booting the system and, when the first BIOS and the first firmware are manipulated or damaged, the electronic device may recover the manipulated or damaged first BIOS and first firmware to boot the system.

Figure 5:
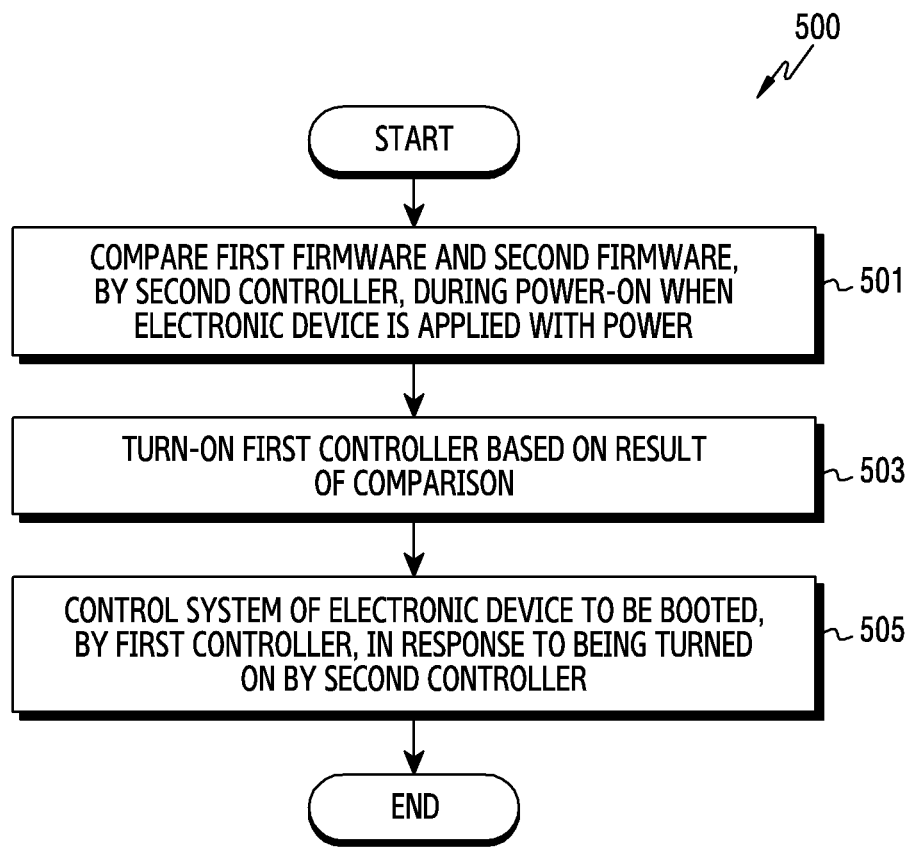
FIG. 5 is a flowchart illustrating a firmware verification operation of an electronic device according to an embodiment of the disclosure.

FIG. 5 is a flowchart 500 for describing a firmware verification operation of an electronic device according to an embodiment of the disclosure.

Referring to FIG. 5, in operation 501, the second controller 120 may compare the first firmware 131 and the second firmware 141 during power-on when the electronic device 100 is applied with power. For example, the second controller 120 may compare the first firmware 131, which is stored in the first memory 130 and configured to control the first controller 110, and the second firmware 141 stored in the second memory 140 and corresponding to the first firmware 131. The second firmware 141 may include backup firmware for the first firmware 131, which is used to recover the first firmware 131. The second controller 120 may compare the first firmware 131 and the second firmware 141 to determine whether the first firmware 131 has been manipulated and/or damaged.

In operation 503, the second controller 120 may turn on the first controller 110 at least based on a result of the comparison. For example, the second controller 120 may turn on the first controller 110 when the first firmware 131 for controlling the first controller 110 matches the second firmware 141. In order to turn on the first controller 110, the second controller 120 may transmit a control signal requesting turn-on to the first controller 110.

In operation 505, the first controller 110 may control the system of the electronic device 100 to be booted, in response to being turned on by the second controller 120. For example, the first controller 110 may transmit a system booting command to the CPU 150 in response to being turned on. According to an embodiment, the CPU 150 may boot the system by executing the first BIOS 133 at least based on the received system boot command.

Figure 6:
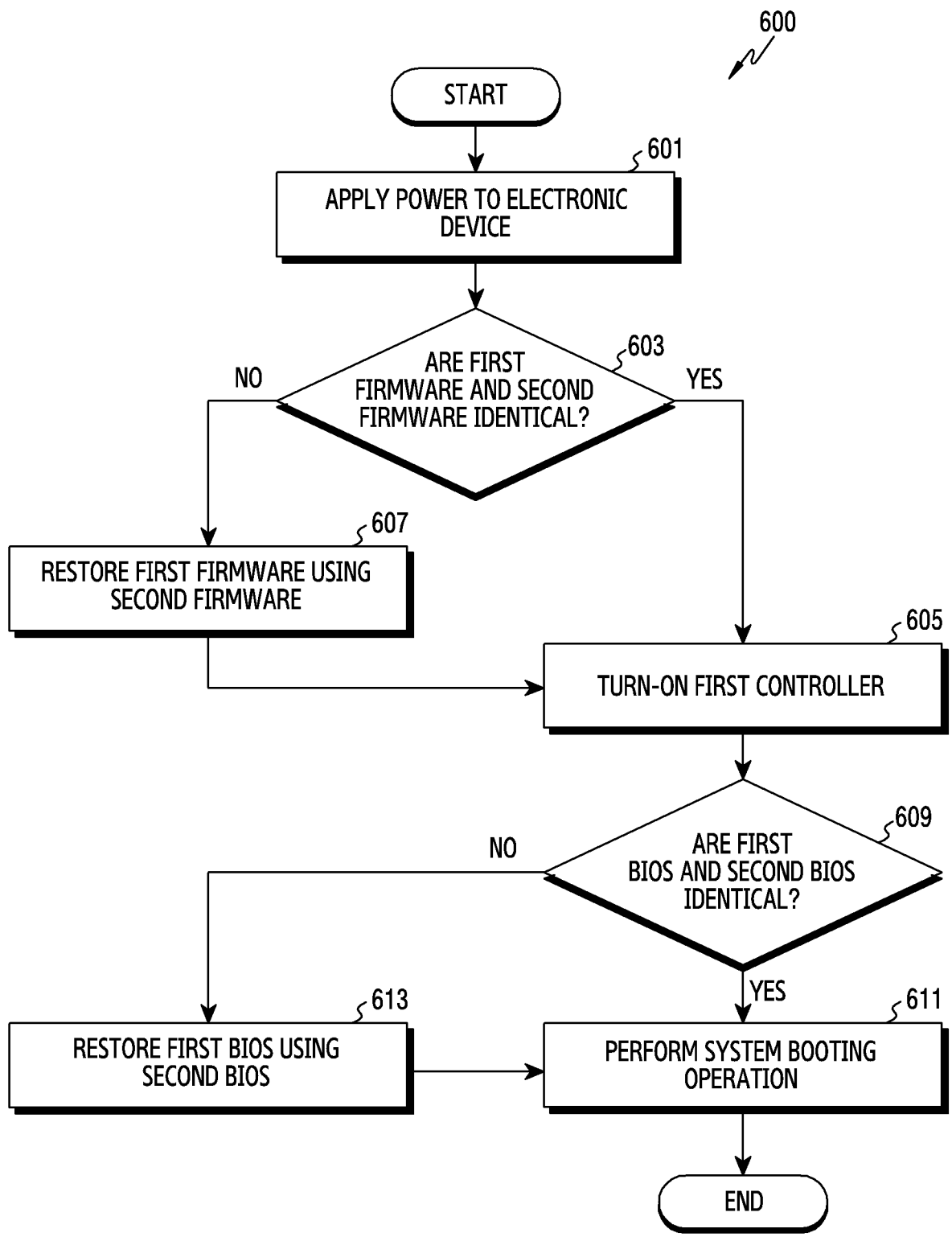
FIG. 6 is a flowchart illustrating a system boot operation of an electronic device according to power application according to an embodiment of the disclosure.

FIG. 6 is a flowchart 600 for describing a system boot operation of an electronic device according to power application according to an embodiment of the disclosure.

Referring to FIG. 6, in operation 601, power may be applied to the electronic device 100. For example, the electronic device 100 with all power removed may identify that power has been applied. For example, the first controller 110 or the second controller 120 included in the electronic device 100 may identify that the electronic device 100 is applied with power.

The second controller 120 may control execution of the function of the electronic device 100 in response to power being applied to the electronic device 100. For example, the second controller 120 may transmit a control signal commanding standby of the first controller 110 to the first controller 110 in response to power being applied to the electronic device 100.

In operation 603, the second controller 120 may compare the first firmware (e.g., the first firmware 131) and the second firmware (e.g., the second firmware 141). For example, the second controller 120 may load the first firmware 131 (e.g., system embedded controller firmware (system EC FW)) for controlling the first controller 110 stored in the first memory 130. In addition, the second controller 120 may load the second firmware 141 corresponding to the first firmware 131. The second firmware 141 may include backup firmware for the first firmware 131, used to recover the first firmware 131.

The second controller 120 may compare the loaded first firmware 131 and the second firmware 141. For example, the second controller 120 may compare the first firmware 131 and the second firmware 141 to determine whether the first firmware 131 has been manipulated and/or damaged. When the first firmware 131 is not manipulated or damaged, the first firmware 131 may include the same code as that of the second firmware 141. However, when the first firmware 131 is manipulated, the first firmware 131 may include a code different from that of the second firmware 141. The second controller 120 may verify the first firmware 131 by comparing the first firmware 131 and the second firmware 141.

In operation 605, in response to the first firmware 131 and the second firmware 141 being the same, the second controller 120 may turn on the first controller 110. For example, the second controller 120 may transmit a control signal for turn-on to the first controller 110. The first controller 110 having received the control signal from the second controller 120 may be turned on in response to the control signal. The turned-on first controller 110 may execute the first firmware 131 to perform an operation related to system booting.

In response to the first firmware 131 and the second firmware 141 not being the same, the second controller 120 may restore the first firmware 131 by using the second firmware 141 in operation 607. For example, when the first firmware 131 and the second firmware 141 are not identical as a result of the comparison, the second controller 120 may identify that the first firmware 131 has been manipulated. Accordingly, the second controller 120 may overwrite the first firmware 131 with the second firmware 141 to restore the first firmware 131. According to an embodiment of the disclosure, the second controller 120 may perform operation 605 in response to restoring the first firmware 131.

The second controller 120 may perform operation 607, and may verify the first firmware 131 and the second firmware 141 by performing another comparison. For example, the second controller 120 may overwrite the first firmware 131 with the second firmware 141, and may compare the first firmware 131 and the second firmware 141 again to identify whether the restoration of the first firmware 131 has been properly performed. The second controller 120 may perform operation 605 when the first firmware 131 and the second firmware 141 are the same at least based on the comparison result.

The electronic device 100 may perform a verification operation on the first firmware 131 before the first controller 110 is turned on, thereby operating the first controller 110 in a state where the integrity of the first firmware 131, which is a firmware for controlling the operation of the first controller 110, is verified.

In operation 609, the second controller 120 may compare the first BIOS 133 and the second BIOS 143. For example, the second controller 120 may load the first BIOS 133 stored in the first memory 130 and configured for the basic operation of the system of the electronic device 100. In addition, the second controller 120 may load the second BIOS 143 corresponding to the first BIOS 133. According to an embodiment of the disclosure, the second BIOS 143 may include a backup BIOS relating to the first BIOS 133, used to restore the first BIOS 133.

The second controller 120 may compare the loaded first BIOS 133 and the second BIOS 143. For example, the second controller 120 may compare the first BIOS 133 and the second BIOS 143 to determine whether the first BIOS 133 is manipulated and/or damaged. When the first BIOS 133 is not manipulated, the first BIOS 133 may include the same code as that of the second BIOS 143. On the other hand, when the first BIOS 133 is manipulated, the first BIOS 133 may include a code different from that of the second BIOS 143. In an embodiment, the second controller 120 may verify the first BIOS 133 by comparing the first BIOS 133 and the second BIOS 143.

In response to acquiring a boot request command from the first controller 110, the second controller 120 may compare the first BIOS 133 and the second BIOS 143 in operation 609. For example, the turned-on first controller 110 may acquire an input related to the system booting (e.g., a boot request) acquired from a user of the electronic device 100 through a physical key (e.g., a power button) included in the electronic device 100. The first controller 110 may acquire a boot request through a user or various methods including generation of a preconfigured event. In response to acquiring the boot command, the first controller 110 may transfer the boot command to the second controller 120. In addition, in response to acquiring the boot request, the first controller 110 may transfer a right to control execution of the function of the electronic device 100 to the second controller 120. Accordingly, the second controller 120 may compare the first BIOS 133 and the second BIOS 143.

In response to the first BIOS 133 and the second BIOS 143 being the same, the first controller 110 may perform a system boot operation in operation 611. For example, in operation 611, when the first BIOS 133 and the second BIOS 143 are the same, the second controller 120 may transfer a signal related to performing a boot operation to the first controller 110. For example, the second controller 120 may compare the first BIOS 133 and the second BIOS 143, and may transfer a signal related to performing a boot operation (e.g., a verification completion signal for the first BIOS 133) to the first controller 110 at least based on a result of the comparison. The first controller 110 may control, based on the signal, the system of the electronic device 100 to be booted. For example, the first controller 110 may transfer a booting command to the CPU 150. According to an embodiment, the CPU 150 having acquired the booting command from the first controller 110 may execute the first BIOS 133 to perform a boot operation of the system.

In response to the first BIOS 133 and the second BIOS 143 not being the same, the second controller 120 may restore the first BIOS 133 by using the second BIOS 143 in operation 613. For example, the second controller 120 may compare the first BIOS 133 and the second BIOS 143. In addition, when the first BIOS 133 and the second BIOS 143 are not the same, the first BIOS 133 may be identified to be manipulated. Accordingly, the second controller 120 may restore the first BIOS 133 by overwriting the first BIOS 133 with the second BIOS 143. In response to restoring the first BIOS 133, the second controller 120 may transmit a verification result of the first BIOS 133 to the first controller 110.

The second controller 120 may perform operation 613, and may verify the first BIOS 133 and the second BIOS 143 by performing another comparison. For example, the second controller 120 may overwrite the first BIOS 133 with the second BIOS 143, and may compare the first BIOS 133 and the second BIOS 143 again to identify whether the first BIOS 133 is properly restored. When the first BIOS 133 and the second BIOS 143 are the same at least based on the comparison result, the second controller 120 may transfer a signal related to performing a boot operation (e.g., a verification completion signal for the first BIOS 133) to the first controller 110. As the signal is transmitted to the first controller 110, the first controller 110 may have a right to control execution of a function of the electronic device 100. In operation 611, the first controller 110 having acquired the signal may perform a system boot operation.

According to an embodiment of the disclosure, a verification operation on the first BIOS 133 may be performed before the electronic device 100 performs a system boot operation, and thus the electronic device 100 can perform the system booting operation in a state in which the integrity of the first BIOS 133 is verified before the system of the electronic device 100 is booted.

Figure 7:
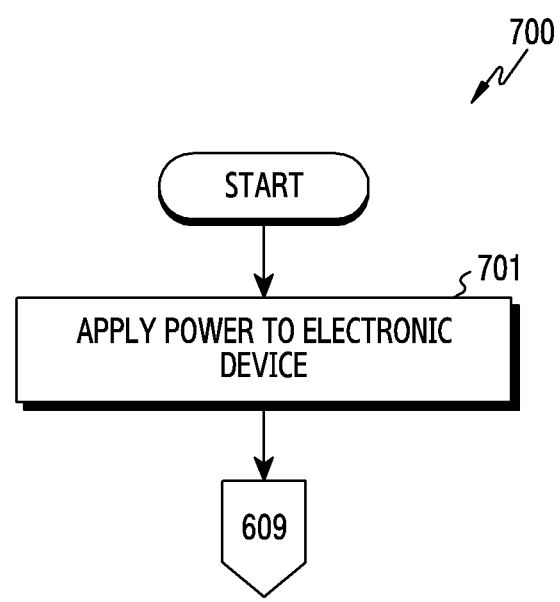
FIG. 7 is a flowchart illustrating a system boot operation of an electronic device according to an embodiment of the disclosure.

FIG. 7 is a flowchart 700 for describing a system boot operation of an electronic device according to an embodiment of the disclosure.

Referring to FIG. 7, in operation 701, the first controller 110 may acquire a boot request for the electronic device 100. The electronic device 100 may be in a state in which the user terminates the electronic device 100 while power is not completely removed from the electronic device 100. The electronic device 100 may acquire a boot request when power supply to the electronic device is being maintained and the electronic device is in a terminated state. For example, the first controller 110 may acquire a boot request for the electronic device. For example, the turned-on first controller 110 may acquire an input related to system booting (e.g., a boot request) acquired from a user of the electronic device 100 through a physical key (e.g., a power button) included in the electronic device 100. The first controller 110 may acquire a boot request through a user or various methods including generation of a preconfigured event.

In response to acquiring the boot request in operation 701, the first controller 110 may execute operation 609. For example, the first controller 110 may transfer the boot request to the second controller 120. In addition, the first controller 110 may transfer a right to control execution of a function of the electronic device 100 to the second controller 120 in response to acquiring the boot request. The electronic device 100 may subsequently perform operations 609 to 613.

According to an embodiment of the disclosure, the electronic device 100 may perform operations 601 to 613 when power is removed and then applied. For example, when the power is not removed and the electronic device 100 is in a terminated state, the electronic device 100 may perform operations 701 and 609 to 613. Accordingly, operation 603 may be performed with a lower frequency compared to operation 609.

As described above, an electronic device (e.g., the electronic device 100 of FIG. 1) according to an embodiment of the disclosure may include a first controller (e.g., the first controller 110 of FIG. 2), a first memory (e.g., the first memory 130 of FIG. 2) configured to store a first basic input output system (BIOS) (e.g., the first BIOS 133 of FIG. 2) and first firmware (e.g., the first firmware 131 of FIG. 2) for controlling the first controller and functionally connected to the first controller, a second memory (e.g., the second memory 140 of FIG. 2) configured to store second firmware (e.g., the second firmware 141 of FIG. 2) corresponding to the first firmware and a second BIOS (e.g., the second BIOS 143 of FIG. 2) corresponding to the first BIOS, and a second controller (e.g., the second controller 120 of FIG. 2) functionally connected to the first memory, the second memory, and the first controller, wherein the second controller is configured to compare the first firmware and the second firmware during power-on when the electronic device is applied with power and turn on the first controller at least based on a result of the comparison, and the first controller is configured to, in response to being turned on by the second controller, control a system of the electronic device to be booted.

The second controller may be configured to, in case that, as a result of the comparison, the first firmware and the second firmware do not match, overwrite the first firmware with the second firmware, and compare and verify the first firmware and the second firmware.

The second controller may be configured to transmit, during the power-on, a first control signal including a standby signal for controlling the electronic device by the second controller, to the first controller.

The first controller may be configured to acquire a boot request for the electronic device and, in response to acquiring the boot request, transmit the boot request to the second controller, the second controller is configured to, in response to the transmitted boot request, compare the first BIOS and the second BIOS, and transmit a second control signal for booting the system to the first controller at least based on a result of the comparison, and the first controller is configured to transmit a system booting command to a central processing unit (CPU) included in the electronic device based on the second control signal.

The second controller may be configured to overwrite the first BIOS with the second BIOS based on the result of the comparison that the first BIOS and the second BIOS do not match, and compare and verify the first BIOS and the second BIOS.

The CPU may be configured to execute the first BIOS according to the system booting command so as to execute booting of the system.

The second controller and the second memory may be configured as a single chip.

The first controller may include a first buffer memory and be configured to load the first firmware stored in the first memory into the first buffer memory in response to being turned on by the second controller, and operate by executing the loaded first firmware.

The second memory may be configured to store third firmware for controlling the second controller, and the second controller may include a second buffer memory and be configured to load the third firmware into the second buffer memory, and operate by executing the loaded third firmware.

The CPU may include a third buffer memory and be configured to load the first BIOS into the third buffer memory in response to a boot request of the system acquired from the first controller, and execute the system booting by executing the loaded first BIOS.

The electronic device may further include a trusted platform module configured to store a security key for the electronic device, wherein the electronic device is configured to, during executing the booting of the system, verify the integrity of the electronic device by using the security key, a security key stored in the CPU, and a security key stored in the second controller.

The boot request may include an input related to booting of the system, acquired from a user of the electronic device through a physical key included in the electronic device.

As described above, according to an embodiment of the disclosure, a method for operating an electronic device including a first memory (e.g., the first memory 130 of FIG. 2), a second memory (e.g., the second memory 140 of FIG. 2), a first controller (e.g., the first controller 110 of FIG. 2), and a second controller (e.g., the second controller 120 of FIG. 2) may include comparing a first firmware, which is stored in the first memory and configured to control the first controller, and a second firmware stored in the second memory and corresponding to the first firmware, turning on the first controller at least based on a result of the comparison, by the second controller, and controlling a system of the electronic device to be booted, by the first controller, in response to the first controller being turned on by the second controller.

The comparing of the first firmware and the second firmware may include in response to the result of the comparison that the first firmware and the second firmware do not match, overwriting the first firmware with the second firmware, and comparing and verifying the first firmware and the second firmware.

The method may further include acquiring a boot request for the electronic device by the first controller, transmitting the boot request to the second controller, by the first controller, in response to acquisition of the boot request, comparing, in response to the transmitted boot request, the first BIOS stored in the first memory and the second BIOS stored in the second memory, by the second controller, transmitting a signal for booting the system to the first controller at least based on a result of the comparison, and transmitting a system booting command to a central processing unit (CPU) included in the electronic device, by the first controller, based on a signal for booting the system.

The comparing of the first BIOS and the second BIOS may include overwriting the first BIOS with the second BIOS in response to the result of the comparison that the first BIOS and the second BIOS do not match, and comparing and verifying the first BIOS and the second BIOS.

The CPU may be configured to execute the first BIOS according to the system booting command so as to execute booting of the system.

The acquiring of the boot request may include acquiring, by the first controller, an input related to booting of the system from a user of the electronic device through a physical key included in the electronic device.

The first controller and the second controller may include a first buffer memory and a second buffer memory, respectively, and the method may further include loading the first firmware into the first buffer memory and executing the loaded first firmware, by the first controller, and loading third firmware for executing the second controller stored in the second memory into the second buffer memory and executing the third firmware, by the second controller.

The CPU may include a third buffer memory, and the method may further include loading, by the CPU, the first BIOS into the third buffer memory in response to the system booting command acquired from the first controller, and executing, by the CPU, the loaded first BIOS so as to execute the system booting.

Figure 8:
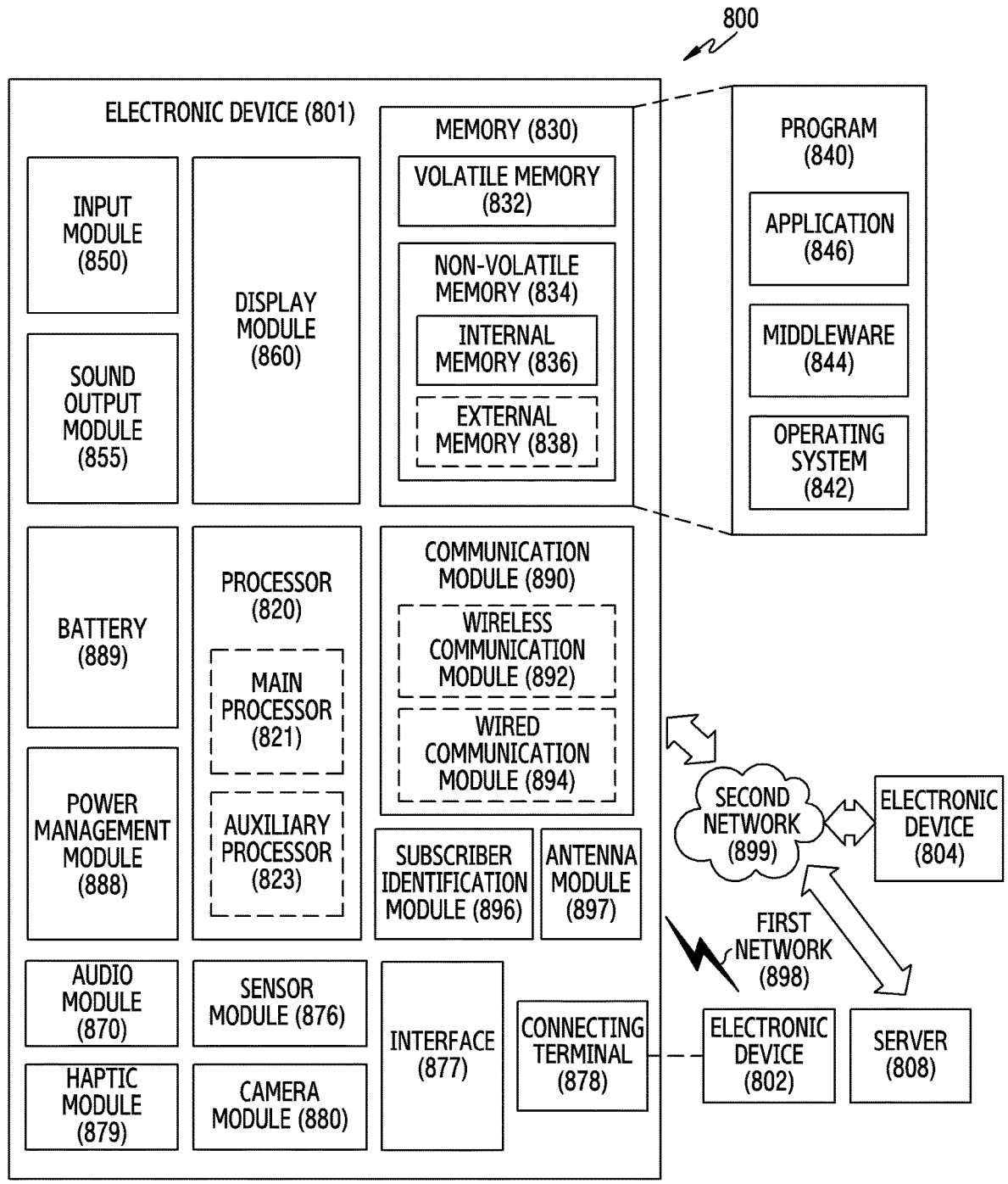
FIG. 8 illustrates an electronic device in a network environment according to an embodiment of the disclosure.

FIG. 8 is a block diagram illustrating an electronic device 801 in a network environment 800 according to various embodiments of the disclosure.

Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, an SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the millimeter wave (mmWave) band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897. According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first controller;
   a first memory configured to store a first basic input output system (BIOS) and first firmware for controlling the first controller and functionally connected to the first controller;
   a second memory configured to store second firmware corresponding to the first firmware and a second BIOS corresponding to the first BIOS; and
   a second controller functionally connected to the first memory, the second memory, and the first controller,
   wherein the second controller is configured to:
      compare the first firmware and the second firmware during power-on when the electronic device is applied with power, and
      turn on the first controller at least based on a result of the comparison, and
   wherein the first controller is configured to, in response to being turned on by the second controller, control a system of the electronic device to be booted.

2. The electronic device of claim 1, wherein the second controller is further configured to, in case that, as a result of the comparison, the first firmware and the second firmware do not match:
   overwrite the first firmware with the second firmware, and
   compare and verify the first firmware and the second firmware.

3. The electronic device of claim 1, wherein the second controller is further configured to transmit, during the power-on, a first control signal including a standby signal for controlling the electronic device by the second controller, to the first controller.

4. The electronic device of claim 1,
   wherein the first controller is further configured to acquire a boot request for the electronic device and, in response to acquiring the boot request, transmit the boot request to the second controller,
   wherein the second controller is further configured to, in response to the transmitted boot request, compare the first BIOS and the second BIOS, and transmit a second control signal for booting the system to the first controller at least based on a result of the comparison, and
   wherein the first controller is further configured to transmit a system booting command to a central processing unit (CPU) included in the electronic device based on the second control signal.

5. The electronic device of claim 4, wherein the second controller is further configured to:
   overwrite the first BIOS with the second BIOS based on the result of the comparison that the first BIOS and the second BIOS do not match, and
   compare and verify the first BIOS and the second BIOS.

6. The electronic device of claim 4, wherein the CPU is configured to execute the first BIOS according to the system booting command so as to execute booting of the system.

7. The electronic device of claim 4, wherein the CPU comprises a third buffer memory and is configured to:
   load the first BIOS into the third buffer memory in response to a boot request of the system acquired from the first controller, and
   execute the system booting by executing the loaded first BIOS.

8. The electronic device of claim 4, further comprising:
   a trusted platform module configured to store a security key for the electronic device,
   wherein the electronic device is configured to, during executing the booting of the system, verify an integrity of the electronic device by using the security key, a security key stored in the CPU, and a security key stored in the second controller.

9. The electronic device of claim 4, wherein the boot request comprises an input related to booting of the system acquired from a user of the electronic device through a physical key included in the electronic device.

10. The electronic device of claim 1, wherein the second controller and the second memory are configured as a single chip.

11. The electronic device of claim 1, wherein the first controller comprises a first buffer memory and is configured to:
   in response to the first controller being turned on by the second controller, load the first firmware stored in the first memory into the first buffer memory, and
   operate by executing the loaded first firmware.

12. The electronic device of claim 1,
   wherein the second memory is configured to store third firmware for controlling the second controller, and
   wherein the second controller comprises a second buffer memory and is further configured to:
      load the third firmware into the second buffer memory, and
      operate by executing the loaded third firmware.

13. A method for operating an electronic device comprising a first memory, a second memory, a first controller, and a second controller, the method comprising:
   comparing, by the second controller, a first firmware, which is stored in the first memory and configured to control the first controller, and a second firmware stored in the second memory and corresponding to the first firmware;
   turning on the first controller at least based on a result of the comparison, by the second controller; and
   controlling a system of the electronic device to be booted, by the first controller, in response to the first controller being turned on by the second controller.

14. The method of claim 13, wherein the comparing of the first firmware and the second firmware comprises:

in response to a result of the comparison that the first firmware and the second firmware do not match, overwriting the first firmware with the second firmware; and comparing and verifying the first firmware and the second firmware.

15. The method of claim 13, further comprising:

acquiring a boot request for the electronic device by the first controller;

in response to acquisition of the boot request, transmitting the boot request to the second controller by the first controller;

in response to the transmitted boot request, comparing a first basic input output system (BIOS) stored in the first memory and a second BIOS stored in the second memory, by the second controller;

transmitting a signal for booting the system to the first controller at least based on a result of the comparison; and transmitting a system booting command to a central processing unit included in the electronic device, by the first controller, based on the signal for booting the system.

16. The method of claim 15, wherein the comparing of the first BIOS and the second BIOS comprises:

overwriting the first BIOS with the second BIOS in response to the result of the comparison that the first BIOS and the second BIOS do not match; and comparing and verifying the first BIOS and the second BIOS.

17. The method of claim 15, wherein the central processing unit is configured to execute the first BIOS according to the system booting command so as to execute booting of the system.

18. The method of claim 15, wherein the acquiring of the boot request comprises acquiring, by the first controller, an input related to booting of the system from a user of the electronic device through a physical key included in the electronic device.

19. The method of claim 15, wherein the central processing unit comprises a third buffer memory, and wherein the method further comprises:

loading, by the central processing unit, the first BIOS into the third buffer memory in response to the system booting command acquired from the first controller, and executing, by the central processing unit, the loaded first BIOS so as to execute the system booting.

20. The method of claim 13, wherein the first controller and the second controller comprise a first buffer memory and a second buffer memory, respectively, and wherein the method further comprises:

loading the first firmware into the first buffer memory and executing the loaded first firmware, by the first controller, and loading third firmware for executing the second controller stored in the second memory into the second buffer memory and executing the third firmware, by the second controller.

\* \* \* \* \*